Aug. 12, 1958    V. K. ZWORYKIN ET AL    2,847,080
AUTOMATIC CONTROL SYSTEM FOR VEHICLES
Filed June 30, 1954    4 Sheets-Sheet 1

INVENTORS
VLADIMIR K. ZWORYKIN
LESLIE E. FLORY &
WINTHROP S. PIKE

BY J. C. Whittaker
ATTORNEY

United States Patent Office 2,847,080
Patented Aug. 12, 1958

2,847,080

AUTOMATIC CONTROL SYSTEM FOR VEHICLES

Vladimir K. Zworykin, Leslie E. Flory, and Winthrop S. Pike, Princeton, N. J., assignors to Radio Corporation of America, a corporation of Delaware Application June 30, 1954, Serial No. 440,452

39 Claims. (Cl. 180—82)

The present invention relates to a vehicle guidance system, and more particularly to an improved system for automatically guiding an automobile down a roadway, or along a selected route.

The driving of an automobile on modern roads, particularly in traffic, differs greatly from the driving of a vehicle over open terrain. In effect, the driver is obliged to follow a prescribed lane, to hold his speed within close limits, and to maintain a definite spacing with respect to other cars. He is almost as restricted in his choices as the locomotive engineer guiding a train along a railroad track.

It is a general object of the present invention to provide an improved automatic driving arrangement which may relieve the driver of his routine duties whenever his car enters or travels a modern road system.

It is another object of the present invention to provide an improved vehicle guidance system in which dangerous conditions in advance of the vehicle such as another car moving at a slower rate or stalled on the highway, automatically cause a warning or control signal to be transmitted to the following vehicle.

It is still another object of the present invention to provide an improved system in which a vehicle is made automatically to stop or to change its course in response to a dangerous condition in advance of the vehicle.

A further object of the present invention is to provide a vehicle guidance system in which a dangerous condition such as a stalled automobile in one lane of a two or more lane highway system causes a warning signal to be produced which is received by a following vehicle and which causes the following vehicle to steer from the lane in which the stalled vehicle is located to a passing lane and after having passed the stalled vehicle to return to the first lane.

Yet another object of the present invention is to provide an improved automatic automobile guidance system wherein an automobile automatically follows a plurality of different highways or routes in order to travel from one place to another.

The foregoing and other objects and advantages are accomplished in accordance with the present invention which provides an improved system wherein each lane of a path of travel is divided into "blocks" in a manner somewhat analogous to railroad practice and means are provided for indicating to vehicles using the path of travel the presence of occupied blocks ahead. Means are also provided for automatically steering the vehicle along the path of travel and for stopping the vehicle or causing it to change lanes when there is an occupied block immediately preceding it. Each block includes warning or control signal transmitting means, which are actuated by a vehicle passing over or stalled in the block, for transmitting a signal the duration of which is a function of the speed of the vehicle passing over the block.

In a preferred embodiment of the invention, each block may comprise a normally inoperative oscillator and a radiator connected to the oscillator extending along the highway in a direction opposite to that of the direction of travel of the vehicle. Means actuated by a vehicle passing over or stalled in the block are connected to the oscillator for rendering it operative. The result is that as a vehicle passes along the highway it creates behind it a "flying tail" of warning or control signals, the duration and amplitude of which may be made dependent upon the speed of the vehicle. This signal is received in the following vehicle and serves as either a warning or control signal. A steering current cable or transmission line extends along the center of the path or paths of travel. The vehicles are provided with means including a pair of sensing devices for causing the vehicle automatically to follow the steering current cable and to correct the course of the vehicle when it tends to veer from the cable path.

In a path of travel consisting of a plurality of lanes, each of the lanes is provided with its own steering current cable and each cable carries current of a different frequency. Means responsive to the "flying tail" signal may be provided for automatically steering the vehicle from the lane occupied by one steering current cable to the lane occupied by another steering current cable so that a stalled or slower moving vehicle in the path of a following vehicle will be passed by the following vehicle.

In another embodiment of the invention the control apparatus in each vehicle actuated by the "flying tail" signal includes means for controlling the gain of the apparatus as a function of the speed of the vehicle. Thus vehicles moving at higher speeds will receive "flying tail" signals at a greater distance from the "flying tail" signal transmitter than vehicles moving at a slower speed.

The invention will be described in greater detail by reference to the following description taken in connection with the accompanying drawing in which.

In the drawing similar reference numerals refer to similar elements.

Figure 1:
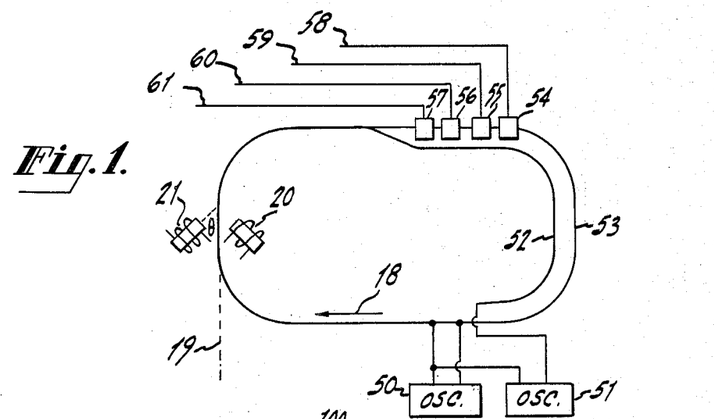
Fig. 1 is a diagram of a typical highway layout in accordance with the present invention.

Referring now to the drawing, and more particularly to Fig. 1, in an automatic vehicle control system in accordance with the present invention, the course traveled by the vehicles consists of main outer steering current wire or cable 53 energized at a first frequency by a first oscillator 50 and inner steering current wire 52 energized at a second frequency by a second oscillator 51. The outer wire defines the main path of travel of a vehicle and the inner wire the passing path. The vehicles travel, for example, in a clock-wise direction as indicated by the arrow 18 and pass one another on the right.

The sensing system of each vehicle (not shown in the drawing) includes a pair of sensing coils 20, 21 which are normally symmetrically mounted with respect to the center line of the vehicle. The sensing coils are tuned to resonance at the frequency of one of the oscillators. Voltages are developed across the two coils due to their position in the magnetic field of the steering current wire. When the voltages are equal, a control mechanism in the vehicle maintains the vehicle "on-course." When the vehicle tends to move "off-course," causing a greater voltage to be developed across one of the coils than the other, the control mechanism causes the vehicle to return to course. Details of the control circuit will be described in connection with Figs. 2 and 3.

In a preferred embodiment of the invention, it has been found advantageous to mount the sensing coils 20, 21 in a plane parallel to the earth and to position the coils so that their axes are at an angle $\theta$ with respect to the center line 19 of the vehicle. When the coils are so mounted, a damping control signal is automatically included in the combined or resultant signals derived from the two coils. Linear analysis shows that the resultant signal contains a damping term $B (\sin \theta) v$, where $B$ is the angular deviation of the vehicle from the correct path and $v$ is the vehicle's speed. This term is proportional to the time-derivative of the positional error of the device. By varying $\theta$ different amounts of damping may be obtained.

The warning circuits are illustrated in Fig. 1 by four "blocks" 54—57, each with its own signal radiator wire 58—61 respectively. Although only four blocks are illustrated, it is to be understood that if it is desired to have warning stations along the entire route to be traveled, the blocks must be spaced along the entire length of the route. Each block is about one car-length long. The presence of an object, especially a metallic one, over the area of roadway defined by a block causes a warning signal to be radiated from the radiating element of the block. The radiating element extends backward along the highway a distance determined by the safe stopping or lane-changing distance of the vehicle for which the highway is designed. Details of the operation of the warning blocks will be given below in connection with Figs. 6–10.

Figures 2, 3:
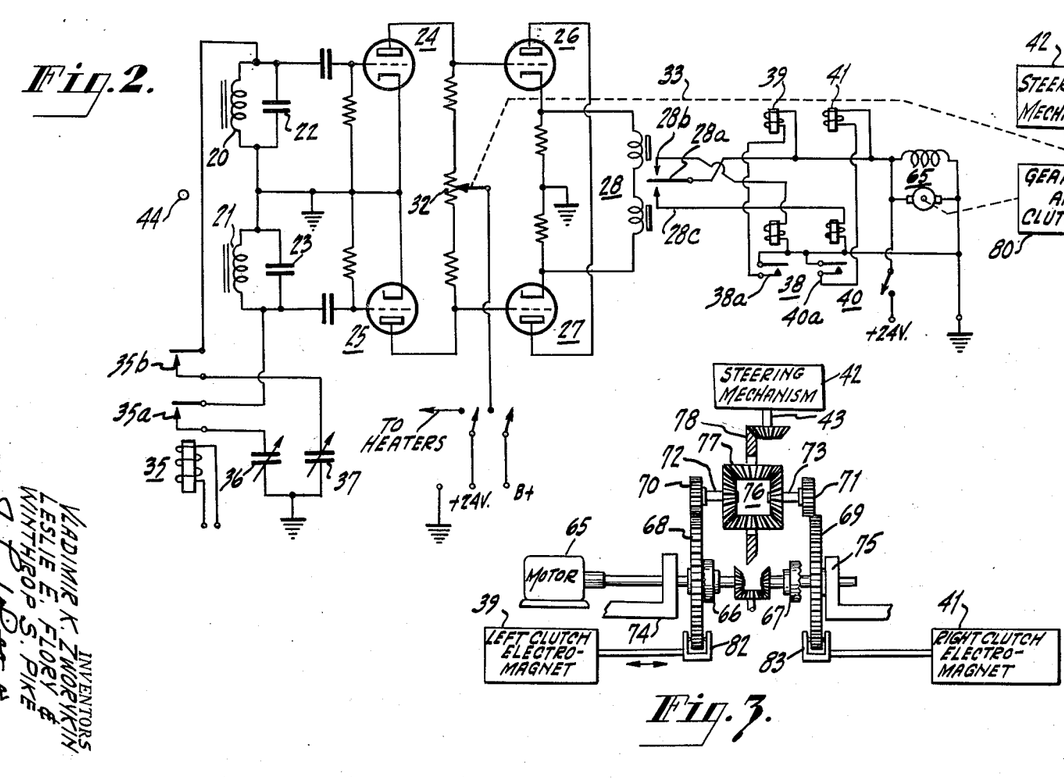
Fig. 2 is a schematic diagram of a vehicle steering control circuit in a typical embodiment of the present invention.
Fig. 3 is a diagram of further details of the steering control system of Fig. 2.

Referring now to Fig. 2, there is shown sensing coils 20, 21 and their associated condensers 22, 23 for tuning said coils to a predetermined frequency. As already mentioned, steering current wire 44 is supplied with current at the frequency to which the coils are tuned. The two coils are connected to the respective control grids of a pair of amplifiers 24, 25 the outputs of which are in turn supplied to the control grids of dual cathode followers 26, 27. Polarized relay 28 is connected to the outputs of the cathode followers. When relay 28 is actuated by current flowing in one direction, contacts 38a of relay 38 are closed, thereby energizing left clutch electromagnet 39; when the relay 28 is actuated by current flowing in the other direction, contacts 40a of relay 40 are closed energizing right clutch electromagnet 41.

Energization of electromagnet 39 causes motor 65 to turn the steering mechanism in one direction and energization of electromagnet 41 causes motor 65 to rotate the steering mechanism in the opposite direction. The motor turns steering mechanism 42 through gearing and clutches 80 and mechanical linkage 43 as illustrated in further detail in Fig. 3. The motor is also mechanically linked to the movable arm of potentiometer 32 through box 80 and mechanical connection 33.

When relay 35 is energized, contacts 35a and 35b thereof are closed, placing tuning condensers 36 and 37 in parallel with condensers 23 and 22 respectively, thereby tuning coils 21 and 20 respectively to a new frequency.

In operation of the circuit of Fig. 2, voltages are developed across coils 20 and 21 due to their position in the magnetic field of wire 44. Capacitors 22 and 23 resonate the coils at the operating frequency of the wire which, in a system actually built, was chosen to be 56 kilocycles. Rectification of the current occurs at the respective control grids of tubes 24, 25 which tubes also act as direct current amplifiers. Assuming that the arm of potentiometer 32 is set to the mid position of the potentiometer, if equal voltages are developed across sensing coils 20 and 21 the cathodes of cathode followers 26 and 27 will be at identical potentials and no current will flow through polarized relay 28. Under these conditions, contacts 28b and 28c are both put in the open position. If the vehicle is displaced from the center of the highway, that is, if one of the sensing coils moves closer to wire 44 and the other of the sensing coils moves farther from the wire, the voltages across the sensing coil become unequal and current will flow through the coil of relay 28. For one direction of displacement, the upper or 28a—b circuit will be closed and for the other direction of displacement, the lower or 28a—c will be closed. When the upper circuit is closed, relay 38 is energized closing contacts of 38a thereof and causing current to flow through electromagnet 39. When the lower circuit is closed, relay 40 is energized causing contacts 40a thereof to close and current to flow through electromagnet 41.

Potentiometer 32 is a "follow-up" potentiometer. It operates in such fashion that the angle through which the vehicle wheels are rotated in response to signals from the steering wire and thus the rate at which it is steered back toward the steering wire is proportional to the displacement of the vehicle from the steering wire, that is, from the center of the lane. To effect this, the potentiometer is mechanically linked by mechanical connections 33, 43 to gearing and clutches 80. It is so connected that when the coil voltages become unbalanced through corresponding unbalance of the plate potentials of the tubes 24, 25 and consequent rotation of the steering mechanism, the movement of the potentiometer arm is in the correct sense to restore the original balance.

Although not illustrated, the above action can be further enhanced by mounting coils 20, 21 on a steering linkage which moves with the servo system in the correct direction to aid restoration of balance.

In order to make possible travel along either one of the two adjacent lanes of travel, provision is made in the servo amplifier to tune circuits 20 and 21 to either of two frequencies in response to signals derived under certain conditions from the automatic warning mechanism. The first of these frequencies, that is, the frequency with which wire 44 is supplied is tuned by means of condensers 22 and 23. When coil 35 is energized, condensers 37 and 36 are placed in parallel with condensers 22 and 23, respectively, thereby tuning sensing coils 20 and 21 to a new frequency. The significance and use of this circuit will be explained in further detail in connection with Fig. 4.

Fig. 3 shows further details of the steering control servo system and includes D.-C. shunt motor 65 which runs continuously and drives, continuously in opposite directions, a pair of clutch members 66 and 67. Clutch 66 is shown as engaging gear 68 which, when driven by clutch 66, drives gear 70. Gear 70 is connected to one input shaft 72 of differential 76. Gear 68 is moved into the position shown when left clutch electromagnet 39 is energized thereby moving U-shaped member 82 to the right. When the left clutch electromagnet is de-energized, U-shaped member 82 is moved to the left against support 74 and this causes input shaft 72 of differential 76 to be braked.

Right clutch 67 is shown as being disengaged from gear member 69. When disengaged, the gear member is moved by right clutch electromagnet 41 and U-shaped member 83 against support 75 and this causes gear 71 and therefore input shaft 73 of differential 76 to be braked. Output shaft 43 of the system is connected by means of gearing to the steering mechanism 42 of the vehicle.

In operation, when the vehicle moves off course, a signal is produced in the proper sense to close either the left or right clutch. This causes movement of one of the input shafts of the differential which in turn actuates the steering mechanism of the vehicle and causes it to return the vehicle to proper course.

It will be apparent to those skilled in the art that many improvements are possible on the system outlined above. For example, in a system designed for a present-day automobile the servomechanism illustrated in Fig. 3 or a similar arrangement may be made to operate hydraulic valves in a manner similar to the present power steering devices in order to control the steering of the automobile.

Figure 4:
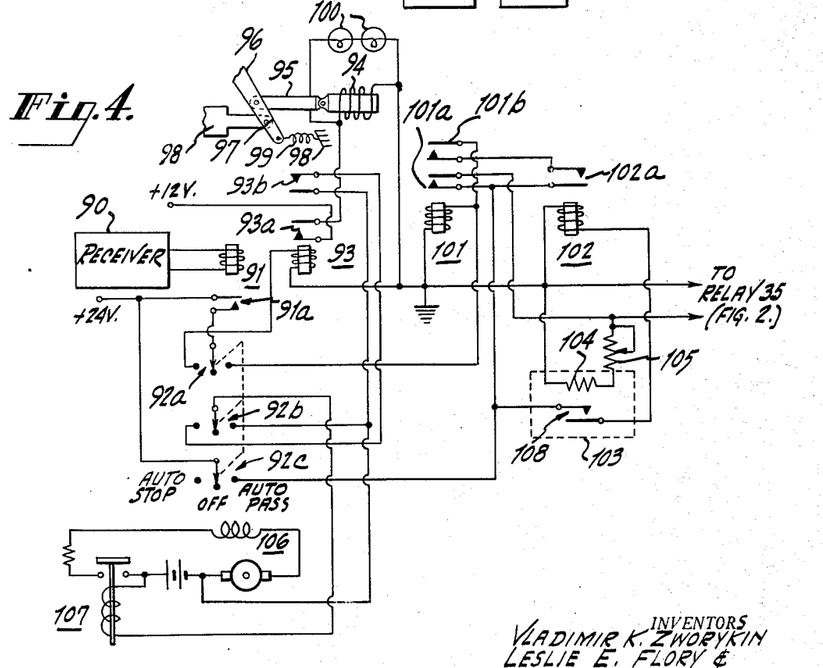
Fig. 4 is a circuit diagram of a typical embodiment of an automatic stopping and passing system of the present invention.

Referring now to Fig. 4, there is shown a receiver 90 carried by each vehicle tuned to the frequency transmitted by the warning blocks illustrated in Fig. 1. In an embodiment of the invention constructed, the warning blocks and receiver were tuned to a frequency of 105 kilocycles. The action of the receiver circuit is such that relay 91 which is connected to the output stage thereof is energized in the absence of a signal, whereby contacts 91a are normally open. When a signal is received, relay 91 is de-actuated and contacts 91a thereof closed applying twenty-four volts to the movable arms of switch bank 92a.

Switch 92 controls the operation of the vehicle. It has three positions: "off," "auto-stop" and "auto-pass." When in the "off" position, power is removed from all of the relays, drive motor relay 107 is unenergized and the vehicle does not run.

When switch 92 is thrown to the "auto-stop" position, the circuit of drive motor relay 107 is closed through bank 92b of switch 92 and normally closed contacts 93b of relay 93. This energizes drive motor 106 which is used to power the vehicle, and the vehicle starts moving. The vehicle will remain on course in the manner already described in connection with Figs. 1 and 2. However, if there should be a dangerous condition ahead, such as a car stalled over one of the warning blocks shown in Fig. 1, that warning block will radiate a signal from its radiating element which signal will be picked up by receiver 90 as it approaches the warning block. When the received signal attains a predetermined amplitude, it causes relay 91 to become de-actuated and contacts 91a thereof to close. Power is then fed through closed contacts 91a and switch bank 92a to relay 93 energizing the same. This causes contacts 93b of the relay to open which in turn opens the circuit of drive motor relay 107. Drive motor 106 becomes de-actuated and ceases turning the wheels of the vehicle.

Energization of relay 93 also causes relay contacts 93a to close thereby applying power to solenoid 94. The solenoid is connected through arm 95 to brake lever 96 which is normally biased by means of heavy spring 99 to its released position. The chassis of the automobile is schematically shown at 98. When the solenoid is energized, the brake lever is moved in the clockwise direction about pivot point 97 and the brake is set, causing the vehicle to stop. When brake relay 93 is energized, stop lights 100 are also energized.

When the stalled vehicle ahead of the vehicle carrying receiver 90 is removed, the warning block on which it was formerly positioned ceases transmitting a warning signal. Relay 91 is thereby again actuated and brake relay 93 de-actuated. This latter action causes the brakes to be released, drive motor 107 to be actuated and the vehicle again to start moving.

When switch 92 is thrown to the "auto-pass" position, drive motor relay 107 is closed through switch bank 92b and the automobile starts moving. Upon receipt of a warning signal of greater than a predetermined amplitude by receiver 90, relay 91 becomes de-activated and the contacts 91a thereof close. Power is then supplied through switch bank 92a to relay 101, which locks via its own contacts 101b, and the normally closed contacts 102a of relay 102. Power is also supplied through bank 92c of switch 92 and contacts 102a of relay 101 to relay 35 (Fig. 2) thereby energizing relay 35 and causing the sensing coils 20, 21 to become tuned to a new frequency, that is, the frequency of the passing path 52 (Fig. 1). The car remains in motion and the circuits of Figs. 2 and 3 cause it to steer to the passing path and thereby to avoid any obstacle in path 53 (Fig. 1).

Dashed rectangle 103 designates a time delay relay including heater resistor 104 which is energized through contacts 101a at the same time as relay 35 is energized. After a time sufficient to allow the vehicle to pass the obstacle in path 53, time delay relay contacts 103 close, closing the circuit of relay 102 through bank 92c of switch 92. This opens contacts 102a opening the hold circuit for relay 101 and allowing it to drop out and in turn to de-energize relay 35 in the servo amplifier (Fig. 2). This causes sensing coils 20, 21 to revert to their original frequency and the vehicle to steer back to its original path. When contacts 101a are opened, the time delay relay is also de-energized. It drops out as soon as it has cooled sufficiently and the entire circuit is then ready to repeat its cycle. Potentiometer 105 permits adjustment of the time delay heater current and thus adjustment of the time delay.

Many improvements will be readily apparent to those skilled in the art for an improved arrangement for returning a vehicle to its path of travel after passing an obstacle such as another stalled vehicle or one moving at a slower rate. It will thus be apparent that the length of time required for one vehicle to pass another depends upon the speed at which the passing vehicle is traveling and also upon the speed at which the vehicle being passed is traveling. In one preferred embodiment of the invention the drop out of a relay causing tuning of receiver 90 (Fig. 4) back to its original sensing frequency may be controlled by a mechanism responsive to the speed of the passing vehicle. In another preferred embodiment of the invention there may be provided along the parallel lanes traveled by the passed and passing vehicles advance warning signal transmitting systems, such as described in further detail in connection with Fig. 12. In such systems the passing vehicle is prevented from returning to its original path of travel if there is another vehicle with which it might collide in the original path of travel.

Figure 6:
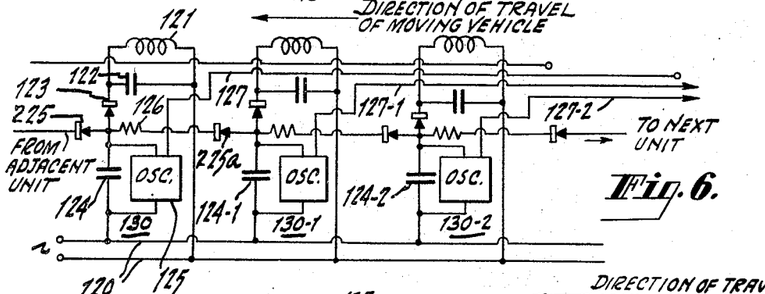
Fig. 6 is a circuit diagram of one embodiment of a warning system used in the present invention.
Figure 7:
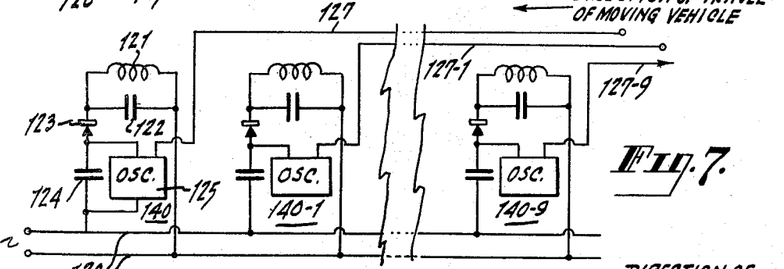
Fig. 7 is a circuit diagram of another embodiment of a warning system.
Figure 8:
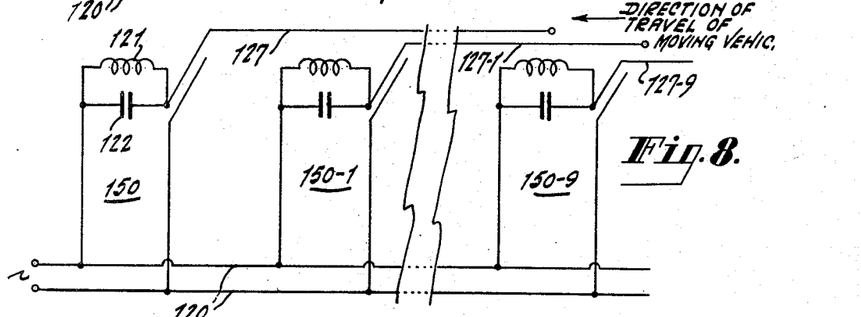
Figure 8 is a circuit diagram of a third embodiment of a warning system.
Figure 9:
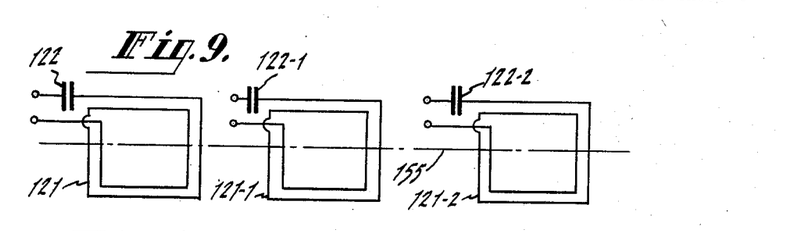
Fig. 9 is a diagram of the tuned circuits of the warning systems of Fig. 6-8 showing the position of the coils of the tuned circuits relative to the path of travel of a vehicle.

A preferred embodiment of a "block" warning system is shown in detail in Fig. 6. Since each of the blocks is identical, only the elements of the first block are numbered, it being understood that the corresponding elements of the other blocks operate in a similar manner. Each block comprises a coil 121, tuning condenser 122, rectifier 123, storage capacitor 124, oscillator 125 and radiator 127. Coil 121, although conventionally illustrated in Fig. 6 and also in Figs. 7 and 8, is ordinarily nearly as large physically as a block, that is, a coil is about the size of a vehicle. This is shown more clearly in Fig. 9 which also shows that the coils are ordinarily symmetrically positioned with respect to the steering current cable, shown as dot-dash line 155.

A high frequency power cable 120 runs the length of the highway to supply power to all of the blocks. Condenser 122 tunes coil 121 to the frequency of this power. Each tuned coil acts as a parallel resonant circuit and therefore interposes a high impedance between power cable 120 and rectifier 123 of its block, thereby substantially preventing any charge from accumulating on the storage capacitor 124. When a car passes over a block, it de-tunes the coil of the block thereby reducing the impedance presented by circuit 121, 122 and permitting storage condenser 124 to charge. A direct current voltage is quickly built up on the storage condenser and it is this voltage which starts oscillator 125, which is associated therewith, operating.

Each oscillator radiates energy via its radiating element 127, which for reasons of safety normally extends several blocks in a backwardly direction. A portion of the charge built up on condenser 124 of block 130 is fed through resistor 126 and rectifier 225a to the storage capacitor 124—1 of the immediately preceding block 130—1 and a portion of the voltage on condenser 124—1 similarly is fed to storage capacitor 124—2 of block 130—2 immediately preceding block 130—1. The result is that as a vehicle passes over a series of blocks it leaves behind it a series of charged capacitors which drive their associated oscillators. The car thus creates behind itself a "flying tail" of energy which gradually dies away as the storage capacitors discharge.

The adjustment of the charging and discharging impedances of the storage capacitors which determine the duration and amplitude of the "flying tail," may be controlled at will. Its duration and amplitude may be made directly proportional to the length of time the car is in a block, thus creating maximum protection behind slow-moving or stalled vehicles.

A second embodiment of a "block" warning system for producing a "flying tail" system is illustrated in Fig. 7 wherein elements corresponding in function to similar elements of Fig. 6 have the same reference numerals applied thereto. The circuit of Fig. 7 is substantially identical to the circuit of Fig. 6 except that there is no connection between the storage capacitors of adjacent stages. It is therefore necessary to extend the length of the radiating elements 127 of each block. In a typical installation, the length of each antenna may be on the order of ten blocks long. Antenna 127, for example, is shown as extending from block 140 to block 140—9. In the block warning system of Fig. 6, on the other hand, the antenna of each block usually extends about two to four blocks backward from its oscillator. In order to provide a signal which decreases in amplitude as the distance from the block is increased, the antenna is preferably made of an attenuating material.

Figure 10:
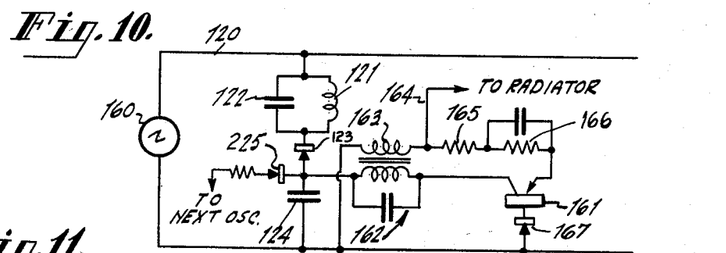
Fig. 10 is a circuit diagram of a transistor oscillator used in the present invention for transmitting a warning signal.

In preferred embodiments of the invention illustrated in Figs. 6 and 7, oscillators 125 comprise transistor oscillators as shown in Fig. 10. Each oscillator comprises a transistor 161 having an output circuit including parallel resonant circuit 162 connected to the collector of the transistor and secondary winding 163 connected to the emitter of the transistor through a pair of series resistors 165, 166. Diode 167 is provided to assist in the starting of the oscillator. Energy is supplied to the transistor by storage capacitor 124 in the manner already described in connection with the circuits of Figs. 6 and 7. Conductor 164 leads to the radiating element.

Although in the description above the block warning circuits are described as including transistor oscillators, it is to be understood that these circuits are equally applicable to other types of warning or control signal transmitting devices. For example, the circuits may be used to operate conventional oscillators or to provide audible or supersonic warning signals if desired. Moreover, it is to be understood that the block warning systems of the present invention, besides being applicable to completely automatic driving systems are also usable independently. For example, such warning devices may be installed along highways which during certain periods of the year become covered with fog so that if there is an obstacle on the highway in the fog area a warning signal will be produced to alert the motorists in following vehicles. This warning signal may be used to actuate a flashing warning signal or light either within the following vehicles or on the highway itself, or to produce a warning blast on a whistle or siren.

Fig. 8 illustrates a third embodiment of a block warning system in accordance with the present invention. This system merely comprises a plurality of tuned circuits 121, 122 and an antenna 127 formed of attenuating material. As in the preceding arrangements, the attenuating antenna is effectively in series with the parallel tuned circuit and source of power and since the tuned circuit normally presents a high impedance to the power frequency, antenna 127 normally does not radiate. When circuit 121, 122 is de-tuned as, for example, when a vehicle passes over the coil, energy is fed from the power line to the antenna and causes the latter to radiate. While the attenuation in the cable produces the desired decrease in amplitude of the "flying tail" in this embodiment of the invention, the amplitude of the signal transmitted ceases to be a function of the speed of the vehicle; the "flying tail" is of fixed length and amplitude. Moreover, in this embodiment of the invention the frequency transmitted is the power frequency whereas in the embodiments of the invention illustrated in Figs. 6 and 7 the transmitted frequency is independent of the power frequency. As in the embodiment of the invention in Fig. 7, each antenna extends backwards a distance of about 10 blocks in a practical installation.

Figure 5:
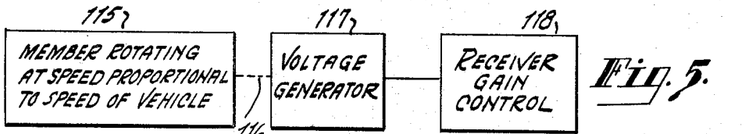
Fig. 5 is a block diagram of a portion of an automatic stopping and passing circuit in accordance with one preferred embodiment of the invention.

In the preferred embodiment of the invention, adapted for use with the block warning devices of Figs. 6, 7 and 8, receiver 90 (Fig. 4) may be arranged so that its sensitivity is directly proportional to the speed of the vehicle. A circuit for accomplishing this objective is illustrated in Fig. 5. Block 115 is a member rotating at a speed proportional to the speed of the vehicle, such as a wheel of the vehicle. Block 115 is connected via mechanical connection 116 to voltage generator 117 which produces a voltage proportional to the speed of the rotating member, that is, proportional to the speed of the vehicle, and this voltage is supplied to the gain control 118 of receiver 90. This circuit enables rapidly moving vehicles to detect obstacles ahead at a greater distance than slower moving vehicles.

The present invention is usable to guide a vehicle from one location via a number of different routes to another location. To permit route identification, a separate frequency may be assigned to every route, or, more precisely, to each lane of every route. At junction points, where routes temporarily merge, steering current cables may be used, which are energized with two different route frequencies. The cables may be laid parallel to each other. Here a transfer to a new route may be effected either mechanically by pressing a push-button on the dashboard of the vehicle causing the sensing coils to become resonant to the frequency of the new route or, as an alternative, the route may be programmed in advance and the changes in route setting controlled by the mileage recorder.

Figures 11, 12:
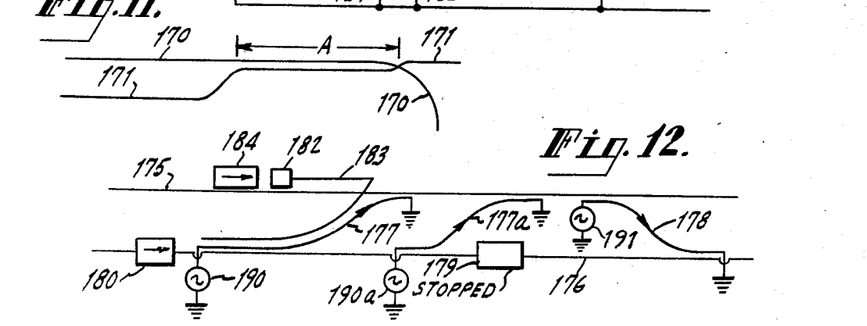
Fig. 11 is a diagram of different paths of travel for a vehicle.
Fig. 12 is another diagram of paths of travel of a vehicle illustrating means for collision prevention.

In this system the driver not only retains complete control of the car speed, but in addition, can switch at will from manual to automatic steering. Fig. 11 illustrates a roadway arrangement wherein this type of system can be employed. Steering current wire 170 is fed with a first frequency and steering current wire 171 with a second frequency. As can be seen, along length A of the two wires they are parallel to one another and rather close together. By pressing a push-button or by automatic means, the sensing coil may be tuned from the frequency of steering current wire 170 to the frequency of steering current wire 171 while the vehicle is proceeding along length A and this will cause the vehicle to change from route 170 to route 171.

In the circuit of Fig. 4, switch 92 must be manually set either to the "auto-stop" or "auto-pass" positions. It is to be understood, however, that the circuit may be made completely automatic. In a completely automatic circuit, it is necessary that a vehicle about to pass a vehicle preceding it which is either stalled or moving at a slower rate than itself be warned if there is already a vehicle in the passing lane with which it might collide. A situation such as this is illustrated in Fig. 12 wherein it is seen that there is a first vehicle 179 stalled on steering current wire 176. This vehicle causes a warning block (not shown) to produce a "flying tail" signal in the direction of moving vehicle 180. If the switch in moving vehicle 180 is in the "auto-pass" position, the sensing coils of said vehicle will become tuned to the frequency of steering current wire 175 and vehicle 180 will begin to turn into the passing lane as soon as it reaches passing wire 177 or 177a. Passing wires 177 and 177a are immediately adjacent wire 176 along a portion of their extent so that the vehicle can easily change to the passing lane, that is, the lane followed by wire 175. These wires are supplied from separate oscillators 190, 190a with current at the same frequency as that applied to wire 175. Similarly, the vehicle will normally return to its original lane via return wire 178 which is adjacent wire 175 for a portion of its extent. Wire 178 is supplied with current of the same frequency as that applied to wire 176 by oscillator 191. In a practical system there are a plurality of passing and return wires located along the entire extent of the highway.

Unfortunately, in the example illustrated, there is a second vehicle 184 already in the passing lane and it would therefore be dangerous for vehicle 180 to pass. In accordance with the invention, vehicle 184, in addition to actuating warning blocks (not shown) providing a backward "flying tail" signal, also actuates a warning block 182 which provides via its antenna 183 a forward-radiated signal at another frequency. Located in vehicle 180 is a second receiver responsive to the second frequency which, when it receives the signal from any forward-transmitting warning block 182, automatically throws switch 92 (Fig. 4) of vehicle 180, to the "auto-stop" position causing the latter vehicle to stop rather than to pass. When vehicle 184 moves into a safe position, warning block 182 no longer transmits a warning signal, the second receiver in vehicle 180 is de-actuated and the switch 92 of vehicle 180 moves to the "auto-pass" position causing said vehicle to start, to move into the passing lane via a passing wire, to pass stopped vehicle 179, and finally to return to its original path via a return wire.

Figure 13:
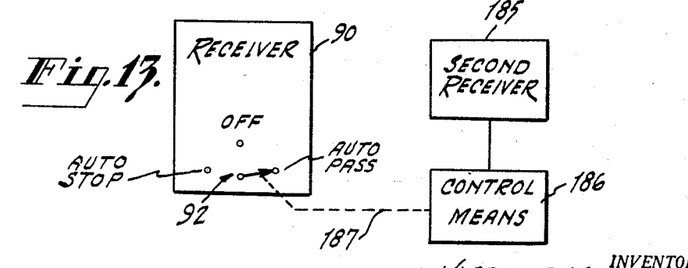
Fig. 13 is a block diagram of a control circuit usable in the present invention.

A system of the above type is illustrated in block form in Fig. 13. Receiver 90 is tuned to the "flying tail" frequency and includes control switch 92, the three banks of which are represented in Fig. 13 as comprising a single switch 92. Second receiver 185 is tuned to the frequency of the forward-transmitting warning block 182, that is, to the frequency radiated by antenna 183 (Fig. 12). Receipt of such a signal by receiver 185 causes the signal to actuate control means 186 which may be a solenoid or motor device and this control means automatically moves the arm of switch 92 from the "auto-pass" position to the "auto-stop" position via mechanical linkage 187.

In the system described above, the vehicle is powered by an electric motor. It is to be understood, however, that the invention is not limited to such means for propelling the vehicle. The invention is equally applicable, for example, to a vehicle driven by a diesel or gasoline motor or one powered by steam or any other means. In these cases, rather than switching the drive means on and off, relay 107 (Fig. 4) may be used to control the throttle of the drive means.

The invention has been stated to be especially applicable to the direction of automobiles along a modern road such as a superhighway. It is to be understood that the invention is also applicable to the guidance of other types of self-propelled devices such as, for example, ships, taxiing aircraft, etc.

What is claimed is:

1. A warning system for a vehicle traveling along a path comprising means for transmitting and propagating along said path an electromagnetic wave at a predetermined frequency, means for controlling the operation of said transmitting means including means responsive to the passage of said vehicle disposed over a portion of said path for providing an output signal having a characteristic varying in accordance with the speed of said passing vehicle, and means connected to said last-named means and responsive to said output signal for conditioning said signal transmitting means for transmitting and propagating said wave for an interval of time after said vehicle has passed over said portion of said path, the duration of said interval being a function of the speed of said vehicle at the time it passes over said portion of said path.

2. A warning system for vehicles traveling along a path comprising a plurality of warning means, said warning means being disposed adjacent said path and spaced from each other therealong, each of said warning means including a warning signal transmitter, a control circuit for conditioning said transmitter for operation, said circuit including means disposed adjacent said path for providing a control signal having a characteristic determined by the speed of a vehicle passing thereby, and means responsive to said control signal for conditioning said transmitter for transmitting a warning signal for an interval, the duration of said interval being a function of the speed of said passing vehicle, whereby said passing vehicle leaves behind it a series of operative warning signal transmitters, the number of said operative transmitters being a function of the speed of said vehicle.

3. A warning system for a vehicle traveling along a path comprising a plurality of warning means spaced from one another, located adjacent said path and extending along the length thereof, each of said means being actuated by the passing of a vehicle adjacent thereto for transmitting a warning signal for an interval of time after the vehicle has passed said warning means, the duration of said interval being a function of the speed of the vehicle as it passes said warning means, each of said warning means including an energy storage device and a warning signal transmitter coupled to said energy storage device and adapted to be actuated thereby, and means in circuit with said energy storage device for charging the latter to an extent dependent upon the speed of said vehicle as it passes adjacent said warning means whereby said vehicle leaves behind it a series of operative warning signal transmitters, the number of said operative transmitters being a function of the speed of said vehicle.

4. A warning system as set forth in claim 3 wherein said means for charging said energy storage device includes a source of alternating current power, rectifier means in series with said source, and impedance means normally presenting a high impedance to the transfer of energy from said source through said rectifier means to said energy storage device and presenting a low impedance to the transfer of said energy when actuated by a vehicle passing adjacent thereto connected between said energy storage device and said rectifier means.

5. A warning system as set forth in claim 4 wherein said impedance means comprises a parallel resonant circuit tuned to the frequency of said source of alternating current power and located in said path, said resonant circuit normally presenting a high impedance to said alternating current and being de-tuned when a vehicle passes thereover so as to present a low impedance to said alternating current.

6. In a vehicle guidance system for vehicles which follow one another along a predetermined path, the combination comprising means disposed adjacent to said path and actuated by the first of said vehicles for providing an output signal of duration in accordance with the speed of said first vehicle along said path, and warning signal transmitting means actuated by said output signal for transmitting a signal the duration of which is related to the speed of said first vehicle as it passes adjacent said first-named means.

7. In a vehicle guidance system for vehicles which follow one another along a predetermined path, the combination comprising means disposed adjacent to said path and actuated by the first of said vehicles for providing an output signal of duration in accordance with the speed of said first vehicle along said path, and warning signal transmitting means actuated by said output signal for transmitting a signal the amplitude and duration of which is inversely proportional to the speed of said first vehicle as it passes adjacent said first-named means.

8. In a vehicle guidance system for vehicles which follow one another along a predetermined path, warning means located adjacent said path and actuated by the first of said vehicle for transmitting a signal the amplitude and duration of which is inversely proportional to the speed of said first vehicle as it passes adjacent said warning means, signal responsive means in said second vehicle for receiving said signal, and means in said second vehicle responsive to the speed of said second vehicle for adjusting the threshold sensitivity of said signal responsive means as a function of said seed.

9. In a vehicle guidance system for vehicles which follow one another along a predetermined path, warning means located adjacent said path and including means actuated by the first of said vehicles for providing an output signal of duration determined by the speed thereof while passing said warning means, and means controlled by said output signal for transmitting a signal the amplitude and duration of which is inversely proportional to the speed of said first vehicle as it passes adjacent said warning means, receiver means in said second vehicle for receiving said signal, brake means in said second vehicle for stopping the same, and means operatively associated with said receiver means and said brake means for actuating said brake means in response to a received signal.

10. In a vehicle guidance system for vehicles which follow one another along a predetermined path, warning means located adjacent said path and including means actuated by the first of said vehicles for providing an output signal of duration determined by the speed thereof while passing said warning means, and means controlled by said output signal for transmitting a signal the amplitude and duration of which is inversely proportional to the speed of said first vehicle as it passes adjacent said warning means, receiver means in said second vehicle for receiving said signal, brake means in said second vehicle for stopping the same, and means operatively associated with said receiver means and said brake means for actuating said brake means in response to a received signal of greater than a predetermined amplitude.

11. In a vehicle guidance system for vehicles which follow one another along a predetermined path and in which there is a second path adjacent said predetermined path, in combination, warning means located in said predetermined path and including means actuated by the first of said vehicles for providing an output signal of duration determined by the speed thereof while passing said warning means, and means controlled by said output signal for transmitting a signal the amplitude and duration of which is inversely proportional to the speed of said first vehicle as it passes over said warning means; receiver means in said second vehicle for receiving said signal; steering means in said second vehicle; and means operatively associated with said receiver means and said steering means for causing said vehicle to turn into the second of said paths in response to a received signal of greater than a predetermined amplitude.

12. In a vehicle guidance system for vehicles which follow one another along a predetermined path and in which there is a second path adjacent said predetermined path, in combination, warning means located in said predetermined path and including means actuated by the first of said vehicles for providing an output signal of duration determined by the speed thereof while passing said warning means, and means controlled by said output signal for transmitting an electromagnetic wave signal the amplitude and duration of which is inversely proportional to the speed of said first vehicle as it passes over said warning means; receiver means in said second vehicle for receiving said signal; steering means in said second vehicle; means operatively associated with said receiver and said steering means for causing said vehicle to turn into the second of said paths in response to a received signal of greater than a predetermined amplitude; and means operatively associated with said steering means for causing said vehicle to return to said predetermined path after a predetermined interval of time.

13. In a vehicle guidance system for vehicles which follow one another along a predetermined path and in which there is a second path adjacent said predetermined path, in combination, first conductive means extending along said predetermined path; first oscillator means connected to said first conductive means for supplying oscillations thereto at a first frequency; second conductive means extending along said second path; at least one passing conductor extending from said first to said second conductive means; means supplying said passing conductor with oscillations at a second frequency; second oscillator means connected to said second conductive means for supplying oscillations thereto at said second frequency; sensing means in each of said vehicles normally tuned to the first of said frequencies for directing said vehicles along said first conductive means in said predetermined path; warning means located in said predetermined path and actuated by the first of said vehicles for transmitting a signal the amplitude and duration of which is inversely proportional to the speed of said first vehicle as it passes over said warning means; receiver means in the second of said vehicles for receiving said signal; and means operatively associated with said receiver means and with the sensing means in said second vehicle for tuning said sensing means to the second of said frequencies in response to a received signal of greater than a predetermined amplitude, whereby said sensing means causes said vehicle to steer to the second of said paths via said passing conductor and to follow said second conductive means.

14. In a vehicle guidance system as set forth in claim 13, said sensing means comprising tuned circuit means for deriving a signal of a predetermined amplitude from the conductive means to which it is tuned when the vehicle in which said sensing means is located follows said conductive means and which departs in amplitude in one sense from said predetermined amplitude when said vehicle veers off course in one direction and which departs in amplitude from said predetermined amplitude in an opposite sense when said vehicle veers off course in an opposite direction, and servomechanism means coupled to said tuned circuit means and responsive to the signal output thereof for maintaining said vehicle on course in response to said signal of predetermined amplitude and for correcting the steering of said vehicle so as to return it to course in response to departures of said signal from said predetermined amplitude, whereby when the frequency to which said tuned circuit means is tuned is changed from the frequency supplied to one of said conductive means to the frequency supplied to the other of said conductive means the signal output of said tuned circuit means changes in a given sense from said predetermined amplitude, and said servomechanism causes said vehicle to steer to the path followed by the other of said conductive means via said passing conductor and to follow said other conductive means.

15. In a vehicle guidance system as set forth in claim 14, said warning means including a source of power at a third frequency, a tuned circuit tuned to said third frequency, an energy storage device, a rectifier, said rectifier, energy storage device, tuned circuit and source of power being connected in series, whereby said tuned circuit presents a high impedance and prevents said source of power from transferring energy to said energy storage device, and a warning signal transmitter connected to said energy storage device and adapted to be actuated thereby when the latter is charged, whereby when a vehicle passes over said warning means it de-tunes the tuned circuit thereof and permits said source of power to charge said energy storage device and said energy storage device to actuate said warning signal transmitter.

16. An automatic warning system for transmitting a warning signal to an approaching vehicle comprising, in combination, a source of power at a predetermined frequency; a parallel tuned circuit tuned to said predetermined frequency located adjacent the path of travel of vehicles; a rectifier; an energy storage device; said source of power, tuned circuit, rectifier, and energy storage device being connected in series, whereby said tuned circuit provides a high impedance and substantially prevents the transfer of energy from said source of power to said energy storage device, and a warning signal transmitter connected to said energy storage device and adapted to be actuated thereby when the latter is charged, whereby when a vehicle passes adjacent said tuned circuit, it de-tunes said circuit reducing the impedance thereof to said predetermined frequency and permits said energy storage device to be charged via said rectifier by said source of power and said energy storage device to actuate said warning signal transmitter.

17. An automatic warning system as set forth in claim 16, wherein said energy storage device comprises a storage capacitor.

18. An automatic warning system as set forth in claim 17, wherein said warning signal transmitter comprises an oscillator.

19. An automatic warning system as set forth in claim 17, wherein said warning signal transmitter comprises a transistor oscillator which is tuned to a frequency different than that of said source of power or any harmonic thereof.

20. An automatic warning system for transmitting a warning signal to approaching vehicles comprising, in combination, a plurality of spaced, parallel tuned circuits extending along the path of travel of said vehicles and tuned to a predetermined frequency; a storage capacitor connected in series with each of said tuned circuits, respectively; a rectifier device connected in series with each of said storage capacitors, respectively; a source of power at said predetermined frequency including a pair of transmission lines extending along the path of travel of said vehicles, each series connection of a tuned circuit, rectifier device and storage capacitor being connected across said transmission line, whereby said tuned circuits provide high impedances to the transfer of energy from said transmission line to said storage capacitors; an oscillator connected across each of said storage capacitors respectively and adapted to be actuated by charges on said storage capacitors; and a radiator connected to the output of each of said oscillators respectively and extending along the path of travel of said vehicles in a direction opposite to the direction of travel of said vehicles, each of said radiators being of the same predetermined length, whereby when a vehicle passes over said tuned circuits it successively detunes said tuned circuits permitting the charging of successive ones of said storage capacitors and the actuating thereby of successive ones of said oscillators.

21. An automatic warning system as set forth in claim 20, and further including rectifying means connected between adjacent ones of said storage capacitors, respectively, in such sense as to permit a portion of the charge on one of said capacitors to be transmitted to the immediately preceding storage capacitor, whereby the de-tuning of any one of said tuned circuits and the consequent charging of the storage capacitors associated with said tuned circuit causes the charging to a lesser extent of the immediately preceding storage capacitor.

22. An automatic warning system as set forth in claim 20 and further including an impedance element in series with a rectifier connected between adjacent ones of said storage capacitors, respectively, in such sense as to permit a portion of the charge on one of said capacitors to be transmitted to the immediately preceding storage capacitor, whereby the de-tuning of any one of said tuned circuits and the consequent charging of the storage capacitors associated with said tuned circuit causes the charging to a lesser extent of the immediately preceding storage capacitor.

23. An automatic warning system as set forth in claim 22 wherein said impedance element consists of a resistor.

24. An automatic warning system as set forth in claim 20 wherein each of said radiators comprise an attenuating cable which extends a distance equivalent to that occupied by approximately ten of said spaced, parallel tuned circuits.

25. An automatic warning system for transmitting a warning signal to approaching vehicles comprising, in combination, a source of power at a predetermined frequency including a pair of transmission lines extending along the path of travel of said vehicles; a plurality of spaced, parallel tuned circuits extending adjacent the path of travel of said vehicles and tuned to said predetermined frequency; a plurality of radiators formed of an attenuating material, each of said radiators being connected to a tuned circuit, said radiators extending adjacent the path of travel of said vehicles in a direction opposite to the direction of travel of said vehicles; means effectively connecting each tuned circuit and the radiator connected thereto across said transmission line, whereby said tuned circuits provide high impedances to the transfer of energy from said transmission line to said radiators and when a vehicle passes adjacent said tuned circuits it successively de-tunes said tuned circuits permitting said transmission line to transfer energy to successive ones of said radiators and thereby cause successive ones of said radiators to radiate energy.

26. An electrical circuit comprising, in combination, signal transmitter means; an energy storage device connected to serve, when charged, as the power source for the signal transmitter means; a parallel resonant circuit tuned to a predetermined frequency and subject to being detuned when an object is placed closer than a given distance therefrom, said circuit being connected in series with said energy storage device; and a source of power at said predetermined frequency connected across the series circuit of said storage device and parallel resonant circuit.

27. An electrical circuit comprising, in combination, signal transmitter means; an energy storage device connected to serve, when charged, as the power source for the signal transmitter means; a parallel resonant circuit tuned to a predetermined frequency and subject to being detuned when an object is placed within a given distance thereof, said circuit being connected in series with said energy storage device; rectifier means connected in series with said energy storage device and said parallel resonant circuit; and a source of power at said given frequency connected across the series circuit of said storage device, parallel resonant circuit, and rectifier means.

28. An electrical circuit as set forth in claim 27, wherein said energy storage device comprises a storage capacitor.

29. A signal transmission system comprising, in combination, signal transmitter means normally inoperative to transmit a signal, means for providing a source of electrical energy, means for providing operating power for said signal transmitter means connected to said transmitter means, said power means being operative to supply power to said signal transmitter means when energized by said source of electrical energy, and impedance means connected between said source of electrical energy and said power means having an impedance characteristic providing a relatively low impedance to permit the flow of energy to said power means when an object is brought closer than a given distance thereto and a relatively high impedance to block the flow of energy to said power means when said object is spaced beyond a given distance therefrom.

30. A signal transmission system comprising, in combination, signal transmitter means normally inoperative to transmit a signal, means providing a source of electrical energy, means providing operating power for said transmitter means connected to said transmitter means for rendering said transmitter means operative when energized by said source of electrical energy, and impedance means connected between said power means and said source of electrical energy for controlling the energization of said power means providing an impedance characteristic which varies as an inverse function of the spacing between said impedance means and an object.

31. A warning system for vehicles traveling along a path comprising means for transmitting a warning signal, means for providing a supply of electrical power for operating said signal transmitting means to transmit a signal, means connected between said signal transmitting means and said power supply means for controlling the operation of said signal transmitting means, and said control means including a device disposed adjacent said path for means including an impedance between said power supply means and said transmitting means to block the flow of power to said signal transmitting means when a vehicle is spaced beyond a given distance therefrom.

32. A warning system for vehicles traveling along a path comprising signal transmitting means including an oscillator circuit for generating a high frequency warning signal, means coupled to said oscillator circuit for propagating said high frequency signal along said path, means for providing a supply of electrical power for operating said signal transmitting means to transmit a signal, means connected between said oscillator circuit of said signal transmitting means and said power supply means for controlling the operation of said oscillator circuit of said signal transmitting means, and said control means including a device disposed adjacent said path for presenting an impedance between said power supply means and said transmitting means to block the flow of power to said signal transmitting means when a vehicle is spaced beyond a given distance therefrom.

33. A warning system in accordance with claim 32 wherein said device is disposed in electromagnetically coupled relationship with vehicles passing adjacent thereto along said path.

34. A warning system in accordance with claim 33 wherein said electrical power supplied by said power supply means is alternating current at a predetermined frequency and said device comprises a coil and a capacitor connected across said coil, said coil and said capacitor providing a tank circuit tuned to said predetermined frequency.

35. A warning system for a vehicle traveling along a path comprising means for propagating along said path an electromagnetic wave at a predetermined frequency, means for controlling the operation of said propagating means including means responsive to the passage of said vehicle disposed adjacent a portion of said path for providing an output signal having a characteristic varying in accordance with the speed of said passing vehicle, and timing means connected to said last-named means and responsive to said output signal for conditioning said wave propagating means for propagating said wave for an interval of time after said vehicle has passed over said portion of said path, the duration of said interval being a function of the speed of said vehicle at the time it passes over said portion of said path.

36. In a vehicle guidance system in which one vehicle follows another vehicle along a predetermined path, the combination comprising means disposed adjacent said path and actuated by the first of said vehicles for providing an output signal of duration in accordance with the speed of said first vehicle along said path, and means controlled by said first named means for propagating a warning signal along said path actuated by said output signal, the duration of which is related to the speed of said first vehicle as it passes adjacent said first-named means.

37. In a vehicle guidance system in which one vehicle follows another vehicle along a path, the combination comprising a plurality of means disposed adjacent said path and spaced from each other along said path for propagating a warning signal in the same direction along said path, means disposed adjacent said path and actuated by the first of said vehicles for providing an output signal for actuating one of said plurality of said signal propagating means, and means connected between each of said signal propagating means for transmitting a signal from said one signal propagating means to a number of propagating means for actuating each of said number of propagating means, said number being determined by the duration of said output signal.

38. In a vehicle guidance system in which one vehicle follows another vehicle along a path, the combination comprising a plurality of means disposed adjacent said path for propagating a radio frequency warning signal in the same direction along said path, a plurality of means disposed along said path and actuated by a vehicle for providing an output signal having a duration determined by the speed of a passing vehicle, each of said last named means being associated with a different one of said signal propagating means for actuation thereof, and means connected between each of said signal propagating means for transmitting a signal of decreasing amplitude to a number of said propagating means located successively along said path, said number being determined by the duration of said output signal, said propagating means located most closely adjacent said one propagating means receiving a signal of greatest amplitude.

39. In a vehicle guidance system in which one vehicle follows another vehicle along a path, the combination comprising a plurality of means disposed adjacent said path for transmitting a radio frequency signal and propagating said signal in the same direction along said path, vehicle detection means disposed along said path and actuated by a vehicle for providing an output signal for actuating one of said plurality of said transmitting means most closely adjacent thereto, and coupling circuits connected between each of said transmitting means for transmitting said output signal to a number of transmitting means located successively along said path for actuating each of said transmitting means for a period, the duration of which is determined by the duration of said output signal and the distance of each of said transmitting means from said one transmitting means.

References Cited in the file of this patent

UNITED STATES PATENTS

| | | |
|---|---|---|
| 1,484,049 | Zworykin | Feb. 19, 1924 |
| 1,905,332 | Barbulesco | Apr. 25, 1933 |
| 2,031,951 | Hartley | Feb. 25, 1936 |
| 2,064,994 | Stirlen et al. | Dec. 22, 1936 |
| 2,188,293 | Williams | Jan. 23, 1940 |
| 2,317,400 | Paulus | Apr. 27, 1943 |
| 2,363,416 | Henroteau | Nov. 21, 1944 |
| 2,488,815 | Hailes | Nov. 22, 1949 |
| 2,547,626 | Douglass | Apr. 3, 1951 |
| 2,661,070 | Ferrill, Jr. | Dec. 1, 1953 |
| 2,803,743 | Ballerait | Aug. 20, 1957 |